United States Patent Office 3,081,288
Patented Mar. 12, 1963

3,081,288
OLEFIN POLYMERS AND THEIR METHOD OF PREPARATION
James T. Edmonds, Jr., Bartlesville, Okla., assignor to Phillips Petroleum Company, a corporation of Delaware
No Drawing. Filed May 13, 1958, Ser. No. 734,834
20 Claims. (Cl. 260—93.7)

This invention relates to novel polymer compositions and method of preparing said compositions. In one aspect the invention relates to improved polymers of 1-olefins prepared by treating said polymers with Friedel-Crafts catalyst. In another aspect the invention relates to a process for preparing polymers.

It is an object of this invention to provide improved polymer compositions.

Another object of this invention is to provide a process for preparing improved polymer compositions.

Still another object of the invention is to provide improved compositions of 1-olefin polymers.

Yet another object of the invention is to provide a process for the preparation of improved compositions of 1-olefin polymers.

Another object of the invention is to provide polymers of 1-olefins which have improved properties of extrudability and a process for their preparation.

These and other objects of the invention will become more readily apparent from the following detailed description and discussion.

The foregoing objects are achieved broadly by treating 1-olefin polymers with Friedel-Crafts catalyst at an elevated temperature and for a period of time sufficient to provide an increase in the melt index of said polymers.

In one aspect of the invention the treatment of the 1-olefin polymers is carried out in the presence of a co-reacting material.

The polymers which are treated within the scope of this invention include a wide variety of olefin polymers such as for example polymers or copolymers of mono-olefins like ethylene, propylene, butylene, etc., also copolymers of mono-olefins and diolefins such as butadiene, isoprene, etc. The invention is particularly applicable to polymers of 1-olefins having a maximum of 8 carbon atoms per molecule and no branching nearer the double bond than the 4-position, and more particularly to polymers of ethylene which have a specific gravity of at least 0.94 at 20° C. and preferably 0.96 or higher and a crystallinity of at least 70 percent and preferably at least 80 percent at ordinary room temperatures.

A preferred polymerization method is described in detail in a copending application of Hogan and Banks, Serial No. 573,877, filed March 26, 1956, now Patent No. 2,825,721. This particular method utilizes a chromium oxide catalyst, containing hexavalent chromium with silica, alumina, silica-alumina, zirconia, thioria, etc. In one embodiment of this application, olefins are polymerized in the presence of a hydrocarbon diluent, for example, an acyclic, alicyclic or, less preferably aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F. and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous procedures which employ different catalysts are also used for preparing olefin polymers. For example, polymers are prepared in the presence of organometallic compounds such as triethylaluminum plus titanium tetrachloride, mixtures of ethylaluminum halides with titanium tetrachloride, and the like. Another group of catalysts which is used comprises a halide of a group IV metal such as, for example, titanium tetrachloride, zirconium tetrachloride, etc., with one or more free metals selected from the group consisting of sodium, potassium, lithium, rubidium, zinc, cadmium and aluminum.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. If it is desired to carry out the process in the vapor state much lower pressures, down to atmospheric, can be employed. When utilizing a fixed bed the space velocity varies from as low as about 0.1 to about 20 volume of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight. Residence time can be from 10 minutes or less to 10 hours or more.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, non-deleterious, and in the liquid state at the reaction conditions can also be employed in carrying out the reaction of olefins to form solid polymers.

The compositions of the present invention are prepared by treating a solution of a 1-olefin polymer with Friedel-Crafts catalyst. This type of catalyst promotes such reactions as isomerization, polymerization, alkylation, hydrogen transfer reactions, etc. The catalysts which can be used include the metal halides, such as aluminum trichloride, boron trifluoride, titanium tetrachloride, and hydrofluoric acid. In addition chlorides of such metals as zinc, tin, zirconium, and iron are also employed. A preferred catalyst is aluminum trichloride, which can contain traces of water. In a like manner the catalyst can also contain traces of alcohols.

The amount of catalyst employed in carrying out modification of the 1-olefin polymer can vary from as low as 1 percent by weight of the polymer to be treated to as high as 20 percent by weight or higher. The amount of catalyst used depends on a number of factors such as the molecular weight of the particular polymer being treated, the temperature and time of treatment and the degree of modification of the polymer desired. Treatment and modification of the polymer is carried out at temperatures as low as 150° F. but preferably at temperatures above 200° F. up to as high as 500° F.

The 1-olefin polymers to be modified are contacted with the acid-type catalyst while in solution. In general the same solvents which are employed in carrying out polymerization of the 1-olefin to form 1-olefin polymers, as hereinbefore set forth, can be employed. Thus the useful solvents include acyclic compounds having between about 3 and about 12 carbon atoms per molecule such as propane, isobutane, normal pentane, isopentane, isooctane, etc., and alicyclic hydrocarbons having between 3 and about 12 carbon atoms per molecule, such as cyclohexane, methylcyclohexane, cyclopentane, dimethylcyclopentane, etc. In addition aromatic hydrocarbons can be employed and halogen-substituted acyclic and aromatic hydrocarbons are also used. Some specific examples include benzene, chlorobenzene, ethylene dichloride, and nitrobenzene, etc. In general any hydrocarbon which is a solvent for the 1-olefin polymer under the treating conditions of temperature and pressure and is inert and non-deleterious in the system can be utilized. However, as shown hereinafter, in some cases the solvent can also be utilized as the co-reacting material.

The time required to carry out modification of the solid 1-olefin polymer depends on a number of factors including the treating temperature, the amount and type of catalyst employed, the particular polymer being modified, etc. Usually the reaction time is between about 1 and about 24 hours although shorter and greater time periods can be utilized.

As previously stated in one aspect of the invention the treatment of the 1-olefin polymer is carried out in the presence of a co-reacting material. When it is desired to use a co-reacting material, this material can be charged to the reaction along with or separately from the catalyst and polymer and at the beginning of or during the treating operation. A wide variety of materials can be co-reacted with the polymer including olefin hydrocarbons having from 2 to 10 carbon atoms, such as ethylene, proplyene, pentene, isobutylenes, isohexenes, heptenes, octenes, etc.; aliphatic, cycloaliphatic, and aromatic alcohols including alkyl substituted alcohols containing 1 to 20 carbon atoms, such as methyl alcohol, ethyl alcohol, isopropyl alcohol, primary, secondary and tertiary butyl alcohol, tertiary hexyl alcohol, secondary octyl alcohol, cyclohexanol, cyclopentanol, methylcyclopentanol, Dimethylcyclohexanol, etc., phenol and ortho, meta and para alkyl substituted phenols, such as ortho, meta and para methylphenols, ethylphenol, primary, secondary, tertiary butylphenols, amylphenols, 1-naphthol, 2-naphthol, 1-methyl-2-naphthol, etc.; aromatic hydrocarbons of the benzene and naphthalene series, including alkyl-substituted aromatic hydrocarbons containing 6 to 20 carbon atoms, such as benzene, naphthalene, methylbenzene, ethylbenzene, propylbenzene, dimethylbenzenes, diethylbenzenes, etc., 1 and 2-methylnaphthalenes, ethylnaphthalenes, etc.; halogen-substituted alkanes, cycloalkanes, and aralkanes, containing one to 20 carbon atoms in which the halogen substituent is chlorine or bromine, including materials such as carbon tetrachloride, chloromethane, chloroethane, chlorobutane, chloropentane, chloroheptane, chlorooctane, chlorocyclohexane, chlorocycloheptane, chlorodimethylcyclooctane, chloromethylcyclohexane, chloromethylcyclopentane, phenylmethylchloride, phenylethylchloride, 1,3-dichloropropane, etc.; and polymers containing unsaturation preferably terminal unsaturation prepared by the polymerization of olefins, such as polyisobutylene, polystyrene, polypropylene, etc. Depending on the degree of modification of the solid 1-olefin polymer desired as little as 10 percent by weight based on the polymer to be modified of the co-reacting material can be employed. There is no definite top amount of the co-reacting material, which in general can be used in amounts up to as high as 500 percent by weight based on the polymer, if desired. When an alcohol or phenol is used as the co-reactant, however, the mols of this material should not exceed the mols of catalyst, since larger amounts might cause hydrolysis and deactivation of the catalyst.

The process of this invention finds particular application in the preparation of modified products from extremely high molecular weight polymers which are characterized by having very poor properties of extrudability. It has been discovered that this type of polymer can be modified to produce polymers of higher extrudability, lower density and other improved properties. Thus, in accordance with this invention it is possible to substantially increase the extrudability of polymers and even to convert a polymer which is substantially non-extrudable to a readily extrudable material. Generally in the commercial molding art, processors are not able to handle polymers having a melt index (ASTM) below about 0.13. According to this invention the polymer property of melt index can be increased manyfold, from as low as a fractional increase to as high as several hundred times the original polymer. More usually the melt index is increased between about 5 to 1 and about 100 to 1 based on the original polymer. These changes in melt index are effected with minimum changes in other desirable properties of the polymers. The novel compositions of this invention can be molded and extruded into sheets, films and various articles. They can be formed into tubes or containers for liquids and can generally be employed in services where solid olefin polymers find use.

The following examples are presented in illustration of the invention and its various aspects.

EXAMPLE I 1500 milliliters of pre-purified cyclohexane was charged to a one gallon reactor which was fitted with a stirrer. 200 grams of a very high molecular weight polyethylene and 10 grams aluminum trichloride were charged to the reactor. The aluminum trichloride which was used was Fisher anhydrous grade, and contained a trace of water.

The high molecular weight polyethylene which was charged was prepared by a chromium oxide-catalyzed polymerization in a pentane slurry. The following conditions were employed in the polymerization run.

*Polymerization Conditions*

Pressure _____ 450 p.s.i.g.
Temperature _____ 210° F.
Pentane feed rate _____ 6167 lbs./hr.
Ethylene feed rate _____ 85 cubic ft./hr.
Catalyst analysis (chromium oxide on silica-alumina) _____ 2.5% Cr as $CrO_3$.
Catalyst activation temperature ___ 1175° F.
Reactor catalyst concentration ____ 0.169 weight percent.
Polymer concentration in reactor __ 20.0%.

The properties of the polymer from the above polymerization are presented in Table I.

After these materials were charged to the reactor, ethylene (Phillips pure grade) was pressured into the reactor until the reactor reached 120 p.s.i.g. The temperature of the reactor was raised to 230° F. and the temperature was maintained at approximately this temperature for 3 hours, the maximum temperature during this time being 250° F. The reactor was then cooled, the excess ethylene was vented, and the reactor was opened. The polymer was removed from the reactor, washed in a Waring blendor with methyl alcohol and dried for 48 hours in a vacuum oven at 70° C. The weight of this dried polymer was 203 grams, and this polymer is designated as polymer 1 in Table I.

Another run was made in a similar manner, except that 20 grams of the same aluminum trichloride was used, and the reaction time was 6 hours and 10 minutes. This polymer is designated as polymer 2 in Table I.

TABLE I

| Properties | Polymer From Catalytic Polymerization | Polymer 1 | Polymer 2 |
|---|---|---|---|
| Inherent viscosity (1) | | 3.236 | 0.651 |
| Melt index (2) | *0.25 | *.32 | **155 |
| Density | 0.954 | .958 | .92 |
| Crystalline Freeze Point, ° F. (3) | 256 | 251 | 226 |
| Impact strength (4) | 15.64 | 12.46 | 4.16 |
| Stiffness, p.s.i. (5) | 170,000 | 90,000 | 15,000 |
| Hardness, Shore D (6) | 68 | 64 | |
| Tensile strength (comp.) (7) | 4,200 | 3,424 | 1,436 |
| Elongation, percent (comp.) (8) | 82 | 148 | 36 |
| Heat distortion temp., ° F. (9) | | 147 | 115 |
| Flex temperature, ° F. (10) | +75 | +18 | −19 |
| Zero strength temperature, ° F. (11) | | 250 | 220 |

* The melt index values for the original polymer and for polymer 1 were determined by using 9.6 times the normal weight for the melt index test.
** The value for polymer 2 was obtained using the normal melt index test.
(1) By method of Kemp et al., Ind. & Eng. Chem. 35, 1108 (1943).
(2) ASTM D 1238-52T: Modified by taking 5 samples at 2 minute intervals, averaging the 5 values (weights), discarding any values which deviate from the average by more than 5% (by weight), reaveraging and multiplying by 5 to obtain the amount of polymer extruded in 10 minutes. In the melt index test in which 9.6 times the normal weight of polymer is used a similar procedure is followed, except that the sample time can vary from 1 to 5 minutes.
(3) Carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve.
(4) ASTM D 256-54T.
(5) ASTM D 747-50: Test carried out on a compression molded slab 1/16" thick.
(6) ASTM D 676-55T: Normally used for testing rubber, adapted for testing plastics.
(7) ASTM D 412-51T: Run at same time utilizing sample cut from slab by means of Type C die as described in ASTM test.
(8) ASTM D 412-51T: Run at same time utilizing sample cut from slab by means of Type C die as described in ASTM test.
(9) ASTM D 648-45T: Run at fiber stress of 66 p.s.i.
(10) ASTM D 1043-51: Flex temperature is point on apparent modulus of elasticity curve at which the apparent modulus is 135,000 p.s.i.
(11) Essentially by method of Islyn Thomas, Injection Molding of Plastics, Reinhold Publishing Co., page 504 (1947).

Infrared analysis of polymer 2 and the original polymer indicate that polymer 2 has an appreciable number of methyl branches whereas the original polymer had virtually no methyl branches. The crystallinity of polymer 2 is 67% as compared with 90% for the original polymer, as determined by infrared.

EXAMPLE II

A run was carried out using essentially the same procedure as employed in the previous example. A different sample of very high molecular weight polyethylene from a chromium oxide-catalyzed polymerization was used in this run. This polymer was prepared at essentially the same polymerization conditions as described in Example I. In this run, 200 grams of this polymer and 20 grams of aluminum trichloride (Mallinckrodt anhydrous grade) were used. After the reactor was closed and heated with stirring to 225° F. the reactor was pressured with isobutylene (Phillips pure grade). The reactor was maintained at 225° F. for 2 hours and 50 minutes, during which time additional charges of isobutylene were used to maintain the pressure at 25 p.s.i.g. After opening the reactor and recovering the polymer by the same procedure as in Example I, 215 grams of dry product were obtained. The properties of the starting material and the product are given in Table II.

TABLE II

| Properties | Starting Material | Product |
|---|---|---|
| Inherent viscosity (1)*** | 6.0 | 3.0 |
| Melt Index (2) | *0.58 | **0.04 |
| Density | 0.952 | 0.943 |
| Crystalline Freeze Point, ° F. (3) | 253 | 249 |
| Impact strength (4) | 19.08 | ᵃ 15.12 |
| Stiffness, p.s.i. (5) | 145,000 | 62,000 |
| Hardness, Shore D (6) | 72 | 64 |
| Tensile strength (comp.) (7) | 3,720 | 2,782 |
| Elongation, percent (comp.) (8) | 78 | 410 |
| Heat distortion temp., ° F. (9) | 199 | 147 |
| Flex temperature, ° F. (10) | +67 | −50 |
| Zero Strength temperature, ° F. (11) | 265 | 263 |

* The melt index value for the original polymer was determined by using 9.6 times the normal weight for the melt index test.
** The value of 0.04 was obtained by a normal melt index test. This corresponds to a value of 6.0 on a modified melt index test such as was used for determining melt index of the original polymer.
*** (1)–(11): Same as Table I.
ᵃ No break.

EXAMPLE III

Two runs were carried out in which isotactical polypropylene from an organometal-catalyzed polymerization was modified according to the process of this invention.

The polypropylene which was used in these runs was prepared by polymerizing propylene at 200–250° F. and 250–310 p.s.i.g. using 4.2 grams of triisobutyl aluminum, 0.6 gram of titanium trichloride and 2 liters of cyclohexane (diluent). 12 runs were made at these conditions, and the polymer which was treated according to the process of this invention was a blend of the polymers resulting from these 12 runs.

In each of the runs in which polypropylene was modified, 800 milliliters of prepurified cyclohexane, 100 grams of polypropylene, and 10 grams of aluminum trichloride (identical to Example I) were employed. After the reactor was closed, the reactor was pressured with ethylene, and additional repressurizations with ethylene were used throughout the run to maintain the pressure between 200 and 300 p.s.i.g. In one run (polymer 3), the total reaction time was 7 hours, 50 minutes of which were at 225° F., while in the other run (polymer 4), the total reaction time was 5 hours and 20 minutes, all of which was at 250° F. and 150–180 p.s.i.g. ethylene pressure. The recovery procedure was identical to that previously described, the yield of dry polymer 3 being 104 grams, and the yield of dry polymer 4 being 87 grams. The results of these tests are given in Table III.

TABLE III

| Properties | Original Polymer | Polymer 3 | Polymer 4 |
|---|---|---|---|
| Inherent viscosity (1)** | 2,789 | 1,455 | 1,826 |
| Melt Index (2) | *0.418 | *2.172 | *7.095 |
| Density | 0.916 | 0.894 | 0.894 |
| Impact strength (4) | 11 | 10.69 | |
| Stiffness, p.s.i. (5) | 50,000 | 18,700 | 33,000 |
| Hardness, Shore D (6) | 55 | 50 | 57 |
| Tensile strength (comp.) (7) | 2,600 | 1,700 | 1,682 |
| Elongation, percent (comp.) (8) | 54 | 288 | 48 |
| Heat distortion temp., ° F. (9) | 140 | 102 | |
| Flex Temperature, ° F. (10) | +12 | +7 | |
| 0 Strength temperature, ° F. (11) | | 289 | 308 |

* As measured by normal melt index test.
** (1)–(11): Same as Table I.

EXAMPLE IV

A run was carried out in which the very high molecular weight polyethylene of Example I was treated with aluminum trichloride in the presence of a solvent which also acted as the co-reacting material.

In this run, 200 grams of polyethylene, identical to that of Example I and 1500 milliliters of xylene were charged to a 3 liter, 3-necked flask, fitted with a stirrer, condenser, drying tube and thermometer. The flask contents were then heated to 266° F., after which 10 grams of aluminum trichloride (identical to that of Example I) were charged to the flask. The contents of the flask were then stirred for 4 hours at 266–275° F., after which the material was allowed to stand overnight. An additional 10 grams of aluminum trichloride was then charged to the reactor and the temperature of the materials was again raised to 266° F. and maintained at this level with stirring for 4 hours.

The flask contents were then poured into 3 liters of methyl alcohol, after which the solid polymer which precipitated was washed three times in a Waring Blendor, using two liters of methyl alcohol for each wash. After drying 48 hours at 70° C. under vacuum, 201 grams of dry polymer was recovered. The alcohol extract from the polymer precipitation step was distilled at a temperature of 200° C. The pot residue from this distillation was a very viscous dark-colored oil, and weighed 80 grams. The properties of the modified polymer are given in Table IV and can be compared directly with the properties for the starting polymer of Example I.

TABLE IV

| Properties: | Modified polymer |
|---|---|
| Inherent viscosity (1) ** | 2.14 |
| Melt index (2) | * 0.69 |
| Density | 0.96 |
| Crystalline freeze point, ° F. (3) | 247 |
| Impact strength (4) | 3.82 |
| Stiffness, p.s.i. (5) | 96,000 |
| Hardness, Shore D (6) | 68 |
| Tensile strength (comp.) (7) | 3,510 |
| Elongation, percent (comp.) (8) | 53 |
| Heat distortion temp., ° F. (9) | 144 |
| Flex temperature, ° F. (10) | +14 |
| 0 strength temperature, ° F. (11) | 230 |

*As measured by normal melt index test.
**(1)–(11): Same as Table I.

An infrared analysis of the polymer which was modified as described above indicated that some xylene was incorporated in the polymer, as indicated by a number of bands in the 11–13 micron region. Crystallinity of the modified polymer as determined by infrared analysis was 83 percent, as compared with 90 percent for the original polymer.

EXAMPLE V 1500 milliliter of dry cyclohexane, 200 grams of polyethylene of Example I, 6 grams of the aluminum trichloride of Example I and 5 grams of 1-chloropentane were charged to a one gallon reactor under nitrogen, flushing and heating to 250° F. with stirring. After maintaining the reactor contents at this temperature for 6 hours with stirring, the reactor was cooled and opened, and the polymer was recovered essentially as described in the previous examples. The yield of dry polymer from this run was 193 grams. The properties of this polymer are given in Table V, and these properties can be compared directly with the original polymer of Example I.

TABLE V

| Properties: | Modified polymer |
|---|---|
| Inherent viscosity (1) ** | 2.925 |
| Melt index (2) | * 0.08 |
| Density | 0.946 |
| Crystalline freeze point, ° F. (3) | 245 |
| Impact strength (4) | 10.55 |
| Stiffness, p.s.i. (5) | 57,000 |
| Hardness, Shore D (6) | 64 |
| Tensile strength (comp.) (7) | 3,038 |
| Elongation, percent (comp.) (8) | 413 |
| Heat distortion temp., ° F. (9) | 122 |
| Flex temperature, ° F. (10) | −8 |
| 0 strength temperature, ° F. (11) | 272 |

*As measured by normal melt index test.
**(1)–(11): Same as Table I.

EXAMPLE VI

Another run was carried out in which the polyethylene (original) of Example I was modified according to the process of this invention. In this run, 1500 milliliter of dry cyclohexane, 50 grams of the polyethylene of Example I, 150 grams of a commercial polystyrene (Koppers 3X) and 20 grams of the aluminum trichloride of Example I were charged to a 1 gallon stirred reactor. The contents of the reactor were then heated to 250° F. and maintained at this temperature with stirring for 6 hours. The polymer was then recovered by essentially the same procedure as described in the previous runs, and the yield of dry polymer was 85 grams. The liquid from the polymer precipitation step was distilled to remove the solvent and methyl alcohol, and the pot residue from this distillation weighed 90 grams. This residue was a very viscous, dark-colored oil. The properties of this modified polymer are given in Table VI.

TABLE VI

| Properties: | Modified polymer |
|---|---|
| Inherent viscosity (1) ** | 2.874 |
| Melt index (2) | * 0.163 |
| Density | 1.006 |
| Crystalline freeze point, ° F. (3) | 248 |
| Impact strength (4) | 0.444 |
| Stiffness, p.s.i. (5) | 170,000 |
| Hardness, Shore D (6) | 76 |
| Tensile strength (comp.) (7) | 1,428 |
| Elongation, percent (comp.) (8) | ------ |
| Heat distortion temp., ° F. (9) | 163 |
| Flex temperature, ° F. (10) | +70 |
| Zero strength temperature (11) | 256 |

*As measured by normal melt index test.
**(1)–(11): Same as Table I.

EXAMPLE VII

A run was carried out in which the very high molecular weight polyethylene of Example I was treated with aluminum trichloride in the presence of carbon tetrachloride.

In this run, 800 milliliters of reagent grade carbon tetrachloride, 10 grams of Fisher anhydrous grade of aluminum chloride and 100 grams of the high molecular weight polyethylene of Example I was charged to a 2780 milliliter stainless steel rocket autoclave. The reactor contents were heated for seven hours at a temperature between 200 and 250° F., the latter temperature being maintained for the last 5 hours.

The reactor was then cooled, and the reactor was opened. The polymer was then removed from the reactor, washed three times in a Waring Blendor with methyl alcohol and dried overnight at 75° C. under vacuum to yield 83 grams of dried polymer. This polymer was then tested for physical properties, and these physical properties are presented below as Table VII.

TABLE VII

| | Product | High Molecular Weight Polymer From Catalytic Polymerization |
|---|---|---|
| Melt Index (2)** | 2.20 | *0.25 |
| Density | 0.957 | 0.954 |
| Stiffness, p.s.i. (5) | 95,000 | 170,000 |
| Hardness, Shore D (6) | 66 | 68 |
| Tensile yield, p.s.i. (comp.) (7) | 3,644 | 4,200 |
| Tensile Break, p.s.i. (comp.) | 2,305 | ---- |
| Elongation, percent (comp.) (8) | 40 | 82 |
| Flex temperature, ° F. (10) | +40 | 75 |
| Zero strength, temperature, ° F. (11) | 258 | ---- |

*High load index previously described.
**Numbered footnotes are identical to those of Example I.

The polymer shown as high molecular weight polymer from catalytic polymerization in the above table is identical to that shown in Table I and is reproduced here for clarity.

It is noted that in each of the foregoing examples treatment of the olefin polymer with a Friedel-Crafts catalyst provided modified polymers having substantially higher melt indexes, and thus improved properties of extrudability.

Having thus described the invention by providing specific examples thereof, it is to be understood that no undue limitations or restrictions are to be drawn by reason thereof and that many variations and modifications are within the scope of the invention.

I claim:

1. A polymer composition prepared by contacting a solution of a normally solid polymer selected from the group consisting of homopolymers of aliphatic mono-1-olefins and copolymers of aliphatic mono-1-olefins only with a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150 and about 500° F. for a sufficient period of time to increase the melt index of said polymer.

2. The composition of claim 1 in which the normally solid polymer is prepared from an aliphatic mono-1-olefin having a maximum of 8 carbon atoms per molecule and no branching nearer the double bond than the 4-position.

3. The composition of claim 2 in which the normally solid polymer comprises polyethylene having a density of at least 0.94 at 20° C. and a crystallinity of at least 70 percent at ordinary room temperatures and the catalyst is aluminum chloride.

4. A polymer composition prepared by contacting a solution of a normally solid polymer selected from the group consisting of homopolymers of aliphatic mono-1-olefins and copolymers of aliphatic mono-1-olefins only with between about 1 and about 20 weight percent based on polymer of a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150° F. and about 500° F. for a period of time between about 1 and about 24 hours and recovering a product having an increased melt index.

5. The composition of claim 4 in which the normally solid polymer comprises polyethylene having a density of at least 0.94 at 20° C. and a crystallinity of at least 70 per cent at ordinary room temperatures and the catalyst is aluminum chloride.

6. A modified polymer composition prepared by contacting a solution of normally solid isotactical polypropylene with ethylene in the presence of between about 1 and about 20 weight percent based on polymer of a melt index modifying agent consisting essentially of aluminum chloride at a temperature between about 150 and about 500° F. for a periof of time between about 1 and about 24 hours.

7. A polymer composition prepared by reacting a solution of a normally solid polymer selected from the group consisting of homopolymers of aliphatic mono-1-olefins and copolymers of aliphatic mono-1-olefins only with a compound selected from the group consisting of hydrocarbon olefins containing 2 to 10 carbon atoms, aromatic hydrocarbons containing 6 to 20 carbon atoms and halogen substituted alkanes, cycloalkanes and aralkanes containing 1 to 20 carbon atoms, in the presence of a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150 and about 500° F. for a period of time sufficient to provide an increase in the melt index of said normally solid 1-olefin polymer.

8. The composition of claim 7 in which the normally solid polymer comprises isotactical polypropylene, the catalyst comprises aluminum chloride, and the reactant compound comprises ethylene.

9. A polymer composition prepared by reacting a solution of a normally solid polymer selected from the group consisting of homopolymers of aliphatic mono-1-olefins and copolymers of aliphatic mono-1-olefins only with between about 10 and about 500 weight percent based on polymer of a compound selected from the group consisting of hydrocarbon olefins containing 2 to 10 carbon atoms, aromatic hydrocarbons containing 6 to 20 carbon atoms, and halogen substituted alkanes, cycloalkanes and aralkanes containing 1 to 20 carbon atoms, in the presence of between about 1 and about 20 weight percent based on polymer of a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150 and about 500° F. for a period of time sufficient to provide an increase in the melt index of said normally solid 1-olefin polymer of between about 5 to 1 and about 100 to 1 based on the original polymer.

10. The composition of claim 9 in which the reactant compound comprises ethylene.

11. The composition of claim 9 in which the reactant compound comprises isobutylene.

12. The composition of claim 9 in which the reactant compound comprises xylene.

13. The composition of claim 9 in which the reactant compound comprises 1-chloropentane.

14. The composition of claim 9 in which the reactant compound comprises carbon tetrachloride.

15. The method of preparing a modified polymer composition which comprises contacting a solution of a normally solid polymer selected from the group consisting of homopolymers of aliphatic mono-1-olefins and copolymers of aliphatic mono-1-olefins only with a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150 and about 500° F. for a period of time sufficient to provide an increase in the melt index from said polymer and recovering said polymer.

16. The method of preparing a modified polymer composition which comprises contacting a solution of normally solid isotactical polypropylene with a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150 and about 500° F. for a period of time sufficient to provide an increase in the melt index of said polymer.

17. The method of preparing a modified polymer composition which comprises contacting a solution of a normally solid polymer selected from the group consisting of homopolymers of aliphatic mono-1-olefins and copolymers of aliphatic mono-1-olefins only with between about 1 and about 20 weight percent based on polymer of a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150° F. and about 500° F. for a period of time between about 1 and 24 hours and recovering a product having an increased melt index.

18. The process of claim 17 in which the normally solid polymer comprises polyethylene having a density of at least 0.94 at 20° C. and a crystallinity of at least 70 percent at ordinary room temperatures and the catalyst is aluminum chloride.

19. The method of preparing a modified polymer composition which comprises reacting a solution of a normally solid polymer selected from the group consisting of homopolymers of aliphatic mono-1-olefins and copolymers of aliphatic mono-1-olefins only with between about 10 and about 500 weight percent of polymer of a compound selected from the group consisting of hydrocarbon olefins containing 2 to 10 carbon atoms, aromatic hydrocarbons containing 6 to 20 carbon atoms, and halogen substituted alkanes, cycloalkanes and aralkanes containing 1 to 20 carbon atoms, in the presence of between about 1 and 20 weight percent based on polymer of a melt index modifying agent consisting essentially of a catalyst selected from the group consisting of aluminum trichloride, ferric chloride, zinc chloride, stannic chloride, titanium tetrachloride, zirconium tetrachloride, boron trifluoride and hydrofluoric acid at a temperature between about 150 and about 500° F. for a period of time sufficient to provide an increase in melt index of said normally solid polymer of between about 5 to 1 and about 100 to 1 based on the original polymer.

20. The process of claim 19 in which the normally solid polymer comprises polyethylene having a density of at least 0.94 at 20° C. and a crystallinity of at least 70 percent at ordinary room temperature and the catalyst is aluminum chloride.

References Cited in the file of this patent

UNITED STATES PATENTS

| | | |
|---|---|---|
| 2,072,120 | Mikeska et al. | Mar. 2, 1937 |
| 2,372,001 | Joyce | Mar. 20, 1945 |
| 2,560,164 | Garber | July 10, 1951 |
| 2,748,105 | Becker et al. | May 29, 1956 |
| 2,822,357 | Brebner et al. | Feb. 4, 1958 |
| 2,824,160 | Knight et al. | Feb. 18, 1958 |
| 2,825,721 | Hogan et al. | Mar. 4, 1958 |
| 2,849,431 | Baxter | Aug. 26, 1958 |
| 2,880,199 | Jezl | Mar. 31, 1959 |